July 23, 1935.  M. MAUL  2,009,021
RECORD CONTROLLED PRINTING MACHINE
Filed March 24, 1931  5 Sheets-Sheet 1

July 23, 1935.                    M. MAUL                    2,009,021

RECORD CONTROLLED PRINTING MACHINE

Filed March 24, 1931         5 Sheets-Sheet 5

≡NATIONAL BANK NEW YORK≡

Herbert Howard

12 Marks Str.

Boston

3860

| № | | | D | C | |
|---|---|---|---|---|---|
| 3860 | 18 05 | Qu | | 7 219 00 | |
| 3860 | 15 06 | Ch | 728 75 | | |
| 3860 | 15 06 | Ue | 1 580 00 | | |
| 3860 | 15 06 | Ca | | 1 000 00 | |
| | | | | | 5 910 25 C |

≡NATIONAL BANK NEW YORK≡

Charles Miller

324 Ann Str.

New York

3856

| N° | | | D | C | |
|---|---|---|---|---|---|
| 3856 | 14 06 | Qu | | 14 300 00 | |
| 3856 | 15 06 | Ch | 200 00 | | |
| 3856 | 15 06 | Ch | 1 165 00 | | |
| 3856 | 15 06 | Ch | 16 325 00 | | |
| 3856 | 15 06 | Ue | | 2 000 00 | |
| 3856 | 15 06 | Ca | | 1 500 00 | |
| 3856 | 15 06 | Ue | 110 50 | | |
| 3856 | 15 06 | Ch | 320 50 | | |
| | | | | | 321 00 D |

≡NATIONAL BANK NEW YORK≡

James Hamilton

5 Vernon Str.

Brocklyn

*Inventor:*

*Michael Maul*

Patented July 23, 1935

2,009,021

UNITED STATES PATENT OFFICE 2,009,021

RECORD CONTROLLED PRINTING MACHINE

Michael Maul, Berlin-Biesdorf, Germany

Application March 24, 1931, Serial No. 524,896
In Germany April 1, 1930

32 Claims. (Cl. 101—58)

The present invention relates to automatic printing machines and more particularly to perforated record controlled machines in which address plates or the like are used from which impressions are taken.

The application of the addressing system in connection with the perforated record system affords many and considerable advantages over the prior art and one instance is more fully set forth in my co-pending application Serial No. 550,939 filed July 15th, 1931 relating to a novel method of preparing statements and the like. The present invention provides a novel machine particularly adapted to the requirements of said novel method but it will be clearly understood that a machine as described and claimed herein is by no means restricted to the application in said novel method but may just as well be applied in various other ways; of course, said novel method may also be carried out with various other means or machines notwithstanding the fact that the present printing machine is highly preferable for said purpose.

In order to obtain the purposes of the invention it is the main object of the same to provide an automatic printing machine being under the joint control of perforated records and of index marks mediately or immediately associated to address plates and to take an impression or print from an address plate if upon comparison the perforations of a record and of the index marks of an address plate are in agreement while upon disagreement no impression is taken.

A further very important object of the invention is to print upon agreement said address plates upon the records themselves bearing said perforations.

Another object of the invention is to provide record feeding means under the control of comparing means and responsive to the result of said comparison.

A further object is to provide a machine of the type referred to wherein the perforated records and the address plates are fed one by one through the machine and wherein a comparison takes place in each machine cycle.

Another object of the invention is to control the feeding means for the perforated records and the address plates differentially depending upon the result of said comparison.

Still another object of the invention is to actuate upon agreement of said perforations with said index marks both the record feeding means and the address plate feeding means while upon disagreement the record feeding means remain inactive and the address plate feeding means are actuated.

Another object of the invention is to provide a machine of the type referred to wherein a perforated record and an address plate are simultaneously analyzed by said comparing means while both the address plate and the record are in printing position.

A further object is to provide comparing means including electrical analyzers for the perforated records and mechanical analyzers for the address plates.

A further object is to provide a machine of the type referred to which responds to perforations and index marks provided according to the combinational system.

A further object is to provide a machine of the type referred to adapted to operate with a continuous record sheet having designation perforations spaced apart along said sheet and still a further object is to provide analyzer means adapted to detect guide holes of said sheet, one hole being coordinated to each designation perforation and controlling the operation of the feeding means as well as the initiation of the comparing operation.

A further object is to provide the designation perforation analyzer means of the comparing mechanism and the guide hole analyzer adjustable relatively to printing position so that the address may be printed within a predetermined range at any desired distance from the designation perforation.

The invention may be advantageously used in work of various sort and for this reason only an illustrative example will now be given and will be explained more in detail in the specification:

If, for instance, statements of accounts, gas or electricity bills or the like are prepared the same may be addressed with the machine according to the present invention. The statements are provided with designation perforations and are fed through the machine one by one in raising or falling order; for each statement must be an address plate present, but it is not necessary that for each address plate there must be a statement with the corresponding designation perforation. If the address plates are fed through the machine in the same order as the statements, the latter will be properly and automatically addressed by the machine as will still be described herein more in detail.

Further objects and advantages of the invention will be seen from the following specification and claims.

While in the specification and claims reference is always made to "address plates" it will be understood that this term shall include any type of equivalent printing devices serving the same purpose such as stencil cards or the like bearing a name or the name and the address, or other identifying matter.

The annexed drawings represent a preferred embodiment of the invention which will now be described.

Figs. 1a, 1b and Figs. 2a, 2b respectively belong together.

*Address plates and record sheets to be addressed*

With the present embodiment of the invention the addressing operation is effected in a known manner by pressing a metal address plate against the record sheet, a ribbon being fed between the record sheet and the address plate. Of course, the invention may also be used in connection with printing plates working according to a chemical process.

Figure 1A:
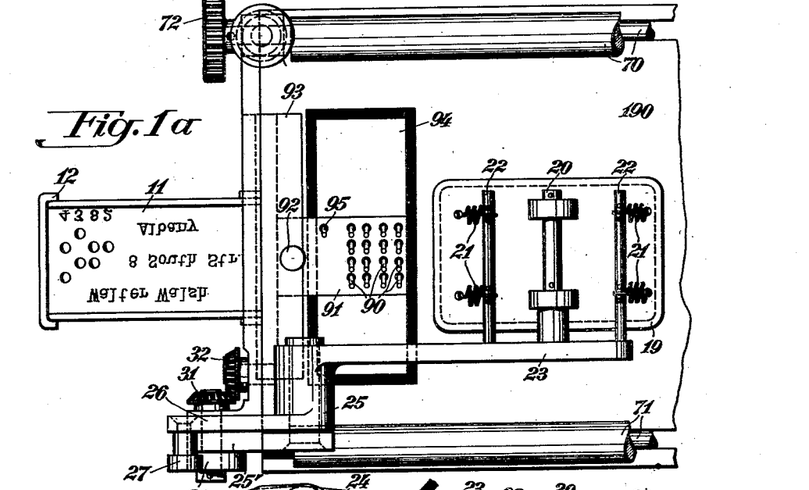
Figs. 1a and 1b represent a top view of the addressing machine according to the invention.
Figure 1B:
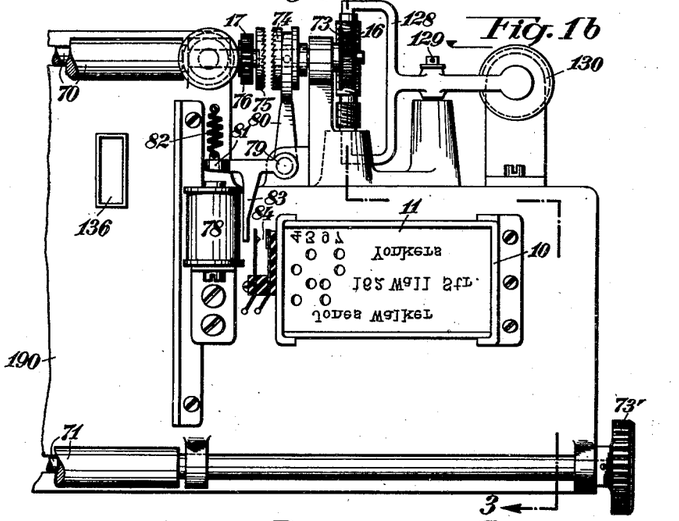

In Figs. 1a and 1b the magazine for the address plates is indicated at 10 in which the plates 11 (see Fig. 2b) are supported upon each other in such a way that the relief side is upwardly directed as shown in the drawings. The plates are fed by a mechanism still to be described from the magazine 10 to the printing position and from there to the receptacle 12. Each of the address plates is provided in addition to a name and an address with an identification number, said numbers representing in the present instance the account numbers of the customers of a bank. The account numbers are also represented by different hole combinations, punched according to the scheme shown in Fig. 5. Thus, for instance the address plate of "Jones Walker" is identified not only by his name and the embossed account number, 4397, but also by the hole combinations representing to the account number. The hole combinations form therefore a physical identification of the address plate and are therefore adapted to be compared with the index marks of the record sheets. The plates are inserted into the magazine 10 in consecutive order. In the present instance it has been assumed that the bank has 6000 accounts; accordingly the same number of address plates must be provided. If now all statements are centrally accounted, all address plates are inserted in numerical order into the magazine 10 in such a way that the address plate with the account number 1 lies lowermost so that all address plates will be fed through the machine one by one. Of course, it is also possible in order to speed up the work to divide the accounts into various groups, for instance in such a way that one machine is provided for addressing the account numbers from 1 to 3000 and a second machine can be used for handling the account numbers from 3001 to 6000.

Figure 7:
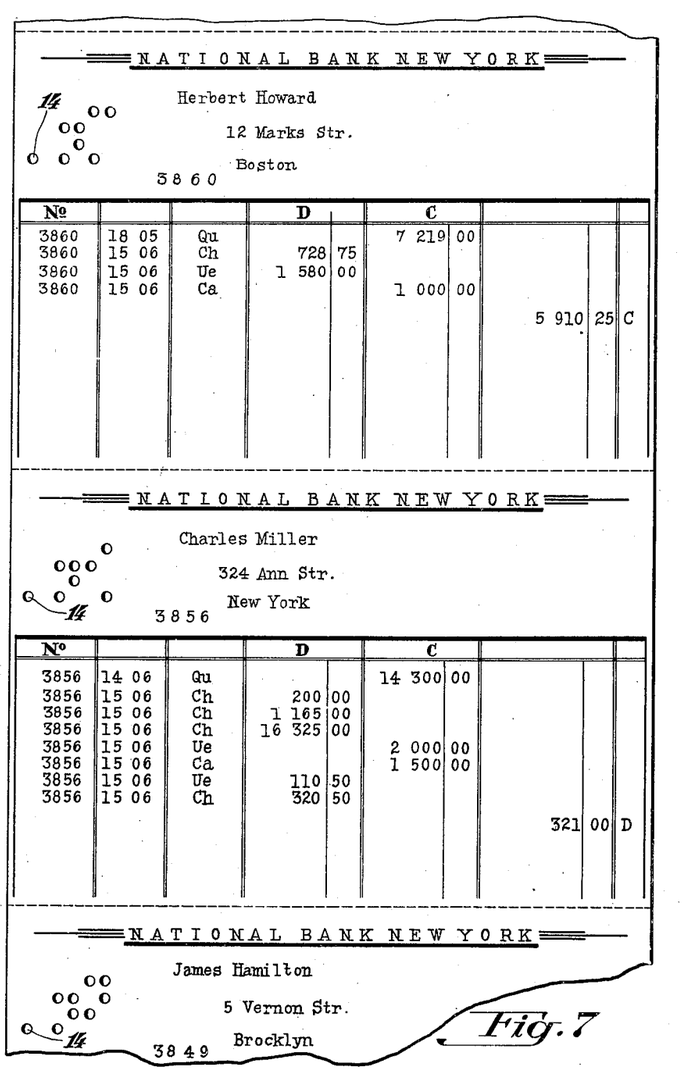
Fig. 7 shows a part of a continuous record sheet comprising several statements of accounts; the addresses have been printed upon said sheet with a machine according to the present invention.

The statements of account which preferably form a continuous record sheet may be seen from Fig. 7 showing a fraction of such a continuous record sheet. For instance, the extreme left column of each statement indicates the account number, the second column indicates the date of the business transaction. In the third column there is shown symbolically by letters the kind of the transacted business. In the columns indicated by "D" and "C" the debit or credit amount respectively is entered. In the last but one column there is finally given the resulting balance and in the last column the letter "D" or "C" indicates whether the balance is a debit or credit balance. From the uppermost statement of account (Herbert Howard) will be seen that the first entry shows a credit amount of 7219,—Dollar representing the previous balance (Qu) of May 18th # (18 05) of the current year. It has been assumed that the bank in question is daily making statements of account and that the represented statements of account have been made on June 15th (15 06).

The preparation of the statements of account may be effected in any printing accounting or bookkeeping or tabulating machine. In these statements the identification is originally only indicated by the account number given in the first column of each statement, while the address shown in Fig. 7 together with the account number printed on the left lower corner of the address is not yet entered upon the sheet, but is to be entered later by means of the machine according to the present invention. Each statement of account must, however, be provided with an identification perforation representing the account number. The preparation of such perforations may be effected either after preparation of the sheets in the accounting machine with any known punching device or it may be effected right in the accounting machine by means of a special punching mechanism. As may be seen from Fig. 7 all hole columns of the same denomination are vertically in alignment in the various statements and the different numerals in the various accounts are represented by different hole combinations; the latter are provided according to the key shown in Fig. 5 in the same way as the account numbers in the address plates. The meaning of the hole combinations is determined by their vertical and horizontal distance from a fixed point or predetermined lines; these are given in the address plates by the edges of the same; in the continuous record sheet, however, the horizontal reference line is lacking. For this reason each statement of account is provided with a "standard point hole" 14 determining the meaning of the hole combinations representing the account number, since the standard point hole is in each instance provided at the same level as the lowermost hole position of the four hole positions serving for the representation of a numeral.

It has been mentioned above that the address plates must be fed in consecutive raising or falling order through the machine without permitting a gap in the sequence of the address plates. The same requirement is, however, not necessary with the statements of account according to Fig. 7. The statements of account are prepared for instance each day only for those accounts upon which any business transaction has taken place. If it is assumed that of the 6000 customers of the bank, as an average about only 1500 customers will do any business with the bank each day, only 1500 statements of account will have to be daily prepared. These statements of account are then—as shown—entered upon a continuous record sheet together with the corresponding account number in such a way that the numerical sequence is observed with respect to the account order; the account numbers will, of course, not follow in running numbers but there may be gaps in the sequence of the numbers of account, said gaps being due to the accounts in which no business has been transacted on the respective day. For instance (see Fig. 7) business has been transacted on June 15th upon the account 3860; the account with the next lower number is the account 3856 which shows that no business has been transacted on June 15th upon the accounts 3859, 3858 and 3857. The next lower account is 3849 which shows that also upon the accounts 3850 to 3855 no business has been transacted on June 15th. The order of the statements of account— whether raising or falling—is immaterial and is only determined by the feeding direction of the record sheet and by the sequence of the numbers of the plates. The only condition is that the plates and the lists are fed to printing position in the same order—either raising or falling.

*Driving mechanism of the addressing machine*

On the frame of the machine the motor 15 (Fig. 3) is fastened having on its shaft a worm 16. From the worm is derived the drive for the plate feed as well as the drive for the sheet feed mechanism and the drive for the printing cushion. The drive for the printing cushion and the plate feed may be coupled to the motor by a one revolution clutch while the drive for feeding the sheet may be coupled by an ordinary clutch mechanism being under the control of the above mentioned standard point holes 14 (Fig. 7) of the continuous record sheet. The plates 11 (Figs. 2a and 2b) are fed in a known way within a channel 17 and are advanced by means of a slide 18 from the right to the left in such a way that a new plate is moved from the magazine during each machine cycle so that all plates will be advanced in the channel 17 by one plate in each cycle, and the plates will consequently be brought into printing position one by one. At the printing position, above which the printing cushion 18' is provided, the record sheet is fed above the address plate being in printing position. The address plates are then fed at the left end of the feed channel 17 to the receptacle 12. At the printing position a ribbon 19' is fed between the record sheet and the address plate, said ribbon being automatically shifted in a known way by a mechanism which is not shown in the drawings. The printing cushion 18' is provided upon the holder 19 pivotally mounted upon the arm 20 and is connected by springs 21 with bars 22 so that it may be yieldingly rocked about the pivot 20. The arms 22 and 20 are fastened upon an arm 23 which on its part is pivotally mounted by means of sleeve 25 upon a shaft 24. The shaft 24 is fast to a bracket 25' of the frame of the machine. The sleeve 25 is provided on its left side with another arm 26 having a roller 27 which is normally drawn by spring 28 against a cam disk 29. The cam disk 29 is fast to a shaft 30 having on its rear end a bevel gear 31 engaging another bevel gear 32. The bevel gear 32 is fast at the end of a shaft 33 receiving its drive from the right side (Fig. 2b) by means of worm 16. The cam disk 29 makes one revolution in the direction indicated upon the release of the one revolution clutch for the printing cushion. The cam 29 is so arranged that the bell crank lever 26, 23 is only depressed during the first quarter of the revolution of the cam 29 so that during the first fourth of the cycle the printing cushion 18 will press the sheet against the ribbon and the address plate in order to print the data of the address upon the lower side of the sheet. Thereupon the lever 26, 23 will be immediately restored under the influence of spring 28 and will remain in its normal position during the further three quarters of the operating cycle. The printing cushion is operated from shaft 33 which in turn is driven by worm 16. For this purpose a worm gear 35 is in mesh with the worm 16 (Fig. 2b), said worm gear being fast upon shaft 36 having on its other end a clutch 37. With the clutch 37 may be engaged another clutch 38, the latter being, however, normally held disengaged therefrom by a pin 39 of a bell crank lever 40 forming the armature of magnet 41, said clutch 38 being retained against the action of spring 42. A yieldingly mounted lever 43 engages a notch in a flange of the clutch 38 in order to retain the clutch and therewith also the shaft 33 and the cam 29 in a correct home position. If the magnet 41 is energized, the bell crank lever 40 will be rocked against the influence of spring 45 about its pivot so that the nose 39 releases the flange of the clutch 38 and the clutches 36, 37 are engaged by means of spring 42. The continuously rotating clutch 37 will therefore rotate shaft 33 upon which the clutch 38 is axially slidable by means of a key; after the immediately following deenergization of magnet 41, the spring 45 will draw the pin 39 downwardly and if the cam of the clutch flange is sliding after one revolution of shaft 33 along the pin 39 the clutch 38 will again be disengaged against the tension of spring 42. Of course, any other one revolution clutch may be employed which is adapted to be electromagnetically controlled.

Plate feeding is effected in the following manner: The worm wheel 47 is in mesh with the worm 16, the wheel being fast upon shaft 48 which is rotatably mounted in a bracket of the machine frame and which has on its other end a clutch 49 rotating continuously with the worm 16. The clutch 49 may be engaged with the clutch 50 which is mounted unrotatably but slidably in longitudinal direction upon the shaft 60 so that the latter will be rotated if the clutches 49, 50 are in engagement. The clutch 49, 50 may be released by means of a pin 51 (in a similar way as has been mentioned in connection with the clutch 37, 38) for rotation and—since it is also provided as one revolution clutch—the shaft 60 will perform one revolution. At the lower end of shaft 60 is a bevel gear 52 fastened which is in mesh with a bevel gear 53 (see also Fig. 3) which is fast upon the shaft of the cam disk 54 the latter being adapted to cooperate with a roller 55 of an arm 57 pivotally mounted at 56. The arm 57 is normally held by a strong spring 58 in the position shown in Fig. 2b in which the trigger 18 pivotally mounted upon the slide 59 is engaging the right hand edge of the lowermost address plate. The upper end of arm 57 is provided with pins 61 engaging into slots of the slide 59. If the one revolution clutch 49, 50 is engaged, the cam disk 54 will perform one revolution. During the first quarter of said revolution the arm 57 will not be moved since the circumference of the cam disk 54 is concentric in the first quarter. During the second and third quarter, however, the disk 54 will rock the arm 57 far enough in counterclockwise direction that the pins 61 will move the slide member 59 and the trigger 18 entirely to the left so that the lowermost address plate 11 will be advanced, thereby advancing also all preceeding plates for an amount corresponding to the length of an address plate. The restoring movement of the lever 57 then occurs during the last quarter of the revolution of disk 54 under the influence of spring 58 so that after one revolution of disk 54 the parts are again in the position shown in Fig. 2b.

The engagement of the one revolution clutch 49, 50 may be controlled either by magnet 41 or by magnet 63. As will still be seen from the following specification, only one of both magnets will be energized in each operation. If the magnet 63 is energized it will attract its armature 64 against the tension of spring 65 and the pin 51 being operatively connected to said armature by a pin and slot connection will be drawn to the left so that the one revolution clutch 49, 50 will be engaged and a plate feeding cycle will be initiated as has been previously described. However, if the magnet 41 is energized, not only the one revolution clutch 38, 37 will be engaged in the above described way but also the one revolution clutch 49, 50. For this purpose the lever 40 controlled by magnet 41 has an extension 65 passing underneath a lip of arm 64. If therefore magnet 41 is energized the arm 65 will be rocked to the left and will also move the armature 64 and consequently the pin 51 against the tension of spring 65 to the left without the magnet 63 being energized. It will be seen that upon energization of magnet 63 only the one revolution clutch 49, 50 is engaged and only a plate feeding cycle will take place, however, upon energization of magnet 41 the one revolution clutch 37, 38 for the printing cushion as well as the one revolution clutch 49, 50 for the plate feed will be engaged. The engagement of the clutches will, of course, take place simultaneously and both operations will be performed synchronously and will last equally long. During the first quarter of the operating cycle the printing cushion will be quickly pressed downwardly and printing will be effected while during the last three quarters of the operating cycle the printing mechanism will remain in rest position. During the first quarter of the operating cycle (while printing takes place) the slide 18, 59 will remain in rest position so that no plate feeding will take place; it is only during the second and third quarter that plate feeding will be effected and during the fourth quarter the slide 18, 59 will return to its home position. In order to secure proper positioning of the address plates in printing position any known means such as for instance stops and so on may be provided.

The sheets to be addressed are fed between the printing cushion 18' and the table 190 of the addressing machine in such a way that the record data (Fig. 7) are on the lower side of the sheet. The feed of the sheets is effected by a pair of feed rollers 70 and a pair of friction rollers 71, each pair being provided with a hand wheel 72 or 73' respectively to enable insertion of the leading end of the sheet into the addressing machine before the machine is started for operation. The upper roller of the pair of rollers 70 is yieldingly mounted in the way shown in Fig. 3 so that the record sheet is firmly gripped by the rollers. The drive of the rollers 70 is also derived from the worm 16 in the following way: At the right hand end of the worm 16 (Figs. 1b and 3) is a worm gear 73 provided being in mesh with the worm; the wheel 73 is fast upon a shaft having on its other end a clutch 74 which is slidable along a key of said shaft but not rotatable thereupon. The clutch 74 may be brought in engagement with a clutch 75 which is adapted to drive the feed rollers 70 by means of gears 76, 77. The clutch 74, 75 is controlled by an electromagnet 78, controlling the clutch mechanism pivotally mounted at 79, said mechanism comprising a fork 80 engaging in a groove of the clutch 74 and the armature 81 of magnet 78. The clutch 74, 75 is normally held disengaged under the influence of a spring 82 (Fig. 1b). However, if the magnet 78 is energized, the mechanism 81, 79, 80 will be rocked in clockwise direction so that the clutch 74, 75 will be engaged thereby driving the feed rollers 70 by worm 16 and feeding the record sheet upwardly (according to the illustration in Figs. 1a and 1b) through the machine. This feeding operation continues during the energization of magnet 78. As soon as the latter becomes deenergized, the clutch 75, 74 will be disengaged under the influence of spring 82 so that the rollers 70 and consequently also the record sheet will be immediately stopped, the sheet being then tightened between the pairs of rollers 70 and 71. With the armature 81 of magnet 78 is an arm 83 connected controlling a contact 84 to which will be referred later in connection with the circuit diagram.

The described paper feed mechanism may of course be replaced by any mechanical device and if only feeding operations of standard length are to be performed the record sheet feed may also be controlled by a one revolution clutch. This is also possible if the sheets to be printed upon are not in the form of a continuous record sheet but in the form of separate lists or cards bearing index marks. If the addresses are to be printed upon cards, for this purpose only a similar slide for the stack of cards were to be provided as in the above described mechanism has been provided for the address plates, and said slide could be under the control of a one revolution clutch which in turn would be under the control of magnet 78.

*Comparing mechanism for record sheet perforations and address plate perforations*

It has already been mentioned that the index marks of the sheets to be addressed and those of the address plates are compared while the sheet and the plate are in printing position, and if the perforation of a sheet or list being in printing position agrees with the perforation of the address plate being in printing position, the respective address plate will be printed upon the sheet. However, if there is no agreement, the address plates will be advanced one by one and after each advance the perforation of the sheet remaining in printing position will be compared with the perforation of the next address plate until agreement is detected whereupon printing takes place and the same operations will be repeated as has been previously described.

For the analyses of the record sheet perforations there is a mechanism provided which will now be described more in detail.

Figure 2A:
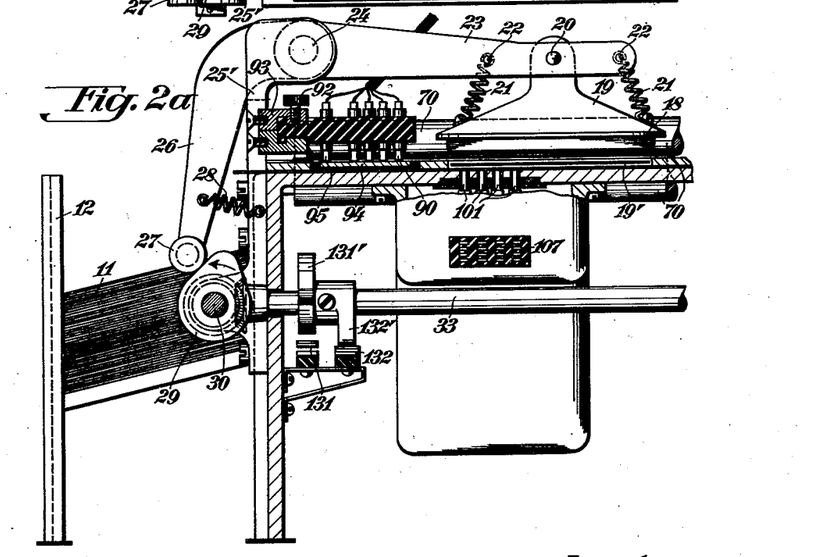
Figs. 2a and 2b represent a section through the machine shown in Figs. 1a and 1b.
Figure 2B:
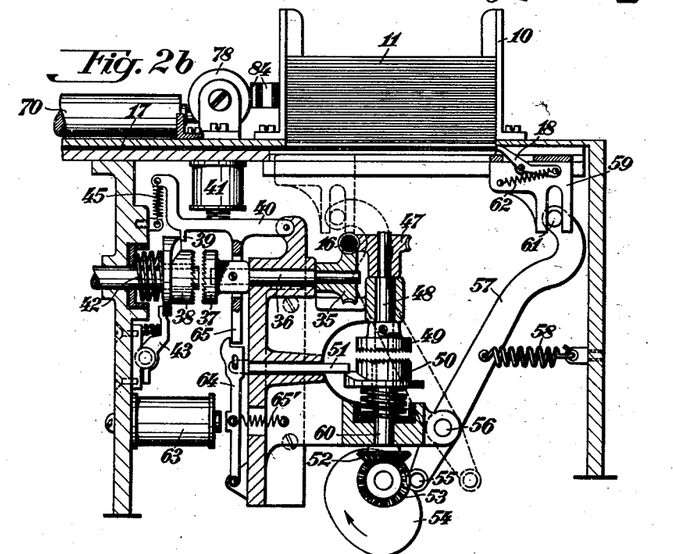
Figures 4, 5:
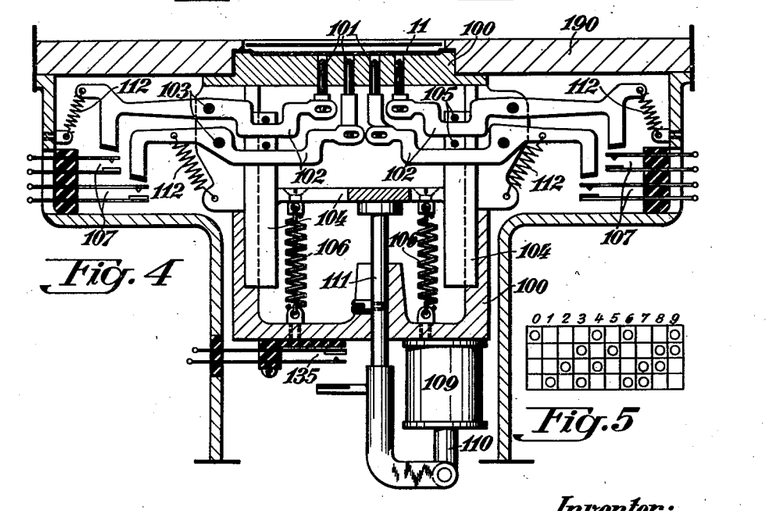
Fig. 4 shows in an enlarged scale the analyzing device for the index marks of the address plates, said marks being provided in the form of hole combinations.
Fig. 5 represents the scheme according to which the numerals in the record sheets to be addressed and in the address plates are represented by hole combinations.

The analyzing mechanism comprises analyzing brushes 90 (Figs. 1a, 2a) provided in four vertical rows, each row comprising four brushes corresponding to one decimal place; the four brushes of each denomination or place serve for the analysis of the four hole positions within which a numeral character is represented by hole combinations. The brushes 90 are mounted slightly inclined in an insulating block 91 which is adjustable along a bar 93 and which may be secured in its adjusted position by means of a set screw 92. This adjustability permits (within certain limits) printing of the addresses in a variable distance from the perforations of the list. The brushes 90 cooperate with a contact plate 94 being insulatingly inserted in the table of the addressing machine. In addition to the analyzing brushes 90 for the number perforation there is provided a special analyzing brush 95 for the previously mentioned standard point hole 14 (Fig. 7) of each list. As will still be seen from the following specification, the sheet is advanced by feed rollers 70 between the brushes 90, 95 and the contact plate 94 until a standard point hole comes beneath the brush 95 (Fig. 1a). In this moment the sheet feeding operation will be interrupted so that the list is stopped in a position in which the standard point hole is beneath the brush 95. It will be seen from Fig. 7 that then all remaining hole positions of the list (which lies now in the machine with the printed data on the lower side) are adjusted beneath the analyzing brushes 90 for the identification perforations. The arrangement of the holes upon the list and that of the analyzing brushes is, of course, in agreement so that all hole positions of a list are simultaneously analyzed by all analyzing brushes. Since in Figs. 1a, 1b the brush slide 91 is adjusted horizontally in alignment with the printing cushion, the address has been printed in Fig. 7 just at the right side of the identification perforation. It may often be desirable that the address be printed somewhat higher or lower than corresponds to the portion of the perforation. For this purpose it is only necessary to adjust the brush block 91 in such a position above or below the middle line of the printing cushion that printing is effected at the desired place. Independently of this adjustment, each time a standard point hole comes under the brush 95 all hole positions of the list will be simultaneously analyzed by the brushes 90 in order to determine the perforated account number. Simultaneously therewith also the identification perforation of the address plate being in printing position must be analyzed. This is effected in the following way:

Underneath the table of the addressing machine is a recess provided covered by the cover plate of a casing 100 (Fig. 4) and over said recess move the address plates 11. In the plate 100 are guided four adjacent rows of pins 101, each row comprising four pins for the analysis of the hole positions of a decimal denomination or place. Fig. 4 shows in an enlarged scale a section through said analyzing mechanism, said section showing the analyzing mechanism for one decimal place. According to the number of required decimal places (in the present four places are required) a corresponding number of such units is provided adjacent each other as may be seen from Fig. 2a showing the analyzing mechanism in a view taken at a right angle to Fig. 4. The analyzing means are, of course, so arranged that they encounter always the predetermined hole positions of the address plates. The pins 101 are by pin and slot connections in operative connection with levers 102 which are pivotally mounted at 103 in slots of the casing 100 which is fastened to the machine. In the casing 100 is a slide frame 104 provided being movable up and down and having cross bars 105 holding the levers 102 normally in the lower position and out of the way of the address plates 11. The frame 104 is held by springs 106 (which are adapted to counteract the springs 106 coordinated to levers 102) normally in the lower position. Each of the levers 102 cooperates on its outer end with a contact 107 in such a way that upon analysis of the address plate said contact will be closed if a hole is provided on the analyzed hole position of the plate. In order to analyze the plate being in printing position, the solenoid 109 is energized, drawing its armature 110 upwardly and consequently moving the arm 111 and the frame 104 against the tension of springs 106 upwardly. Now, the levers 102 are free to follow the cross bars 105 and the springs 112 of the levers 102 will draw the latter upwardly so that the pins 101 will move towards the address plate and will analyze the perforations of the same. If there is no hole under an analyzed position, the respective pins 101 will be stopped and the lever 102 will have been moved only slightly from its home position so that its coordinated contact 107 will not be closed. However, if there is a hole in the address plate on the respective position, the pin 101 will pass through said hole and the lever 102 will be further rocked under the influence of its spring 112 so that the lever will close its coordinated contact 107.

It will be remembered from the previous specification that on each position on which the list is provided with a hole, a conducting connection will have been established between the respective analyzing brush 90 and the contact plate 94, and it has been further shown that on each position on which an address plate is provided with a hole, the coordinated contact 107 will be closed. The analyzing brushes 90 and contacts 107 controlled by identical hole positions (i. e. hole positions of the same decimal denomination and of the same location) operate in such a way that the analyzing brush 90 controls the one winding of a magnet and the contact 107 (which analyzes the identical hole position of the address plate) controls the other winding of the same magnet having two windings; the magnetic influences of said windings are compensated upon simultaneous energization. Consequently for each hole position one magnet is provided, i. e. for each decimal denomination there is a set of four magnets. However, if there is disagreement, i. e. if one position of the address plate is punched and the corresponding position of the list is not punched or vice versa, the one winding of the magnet will be energized which indicates that no agreement consists between list and address plate. This verification of the agreement is effected in all hole positions and if said verification is in the affirmative in all positions i. e. if the identification perforations of the list are in complete agreement with the identification perforations of the address plate, printing will take place. Otherwise the next address plate will be advanced and the list will remain in printing position.

Figure 3:
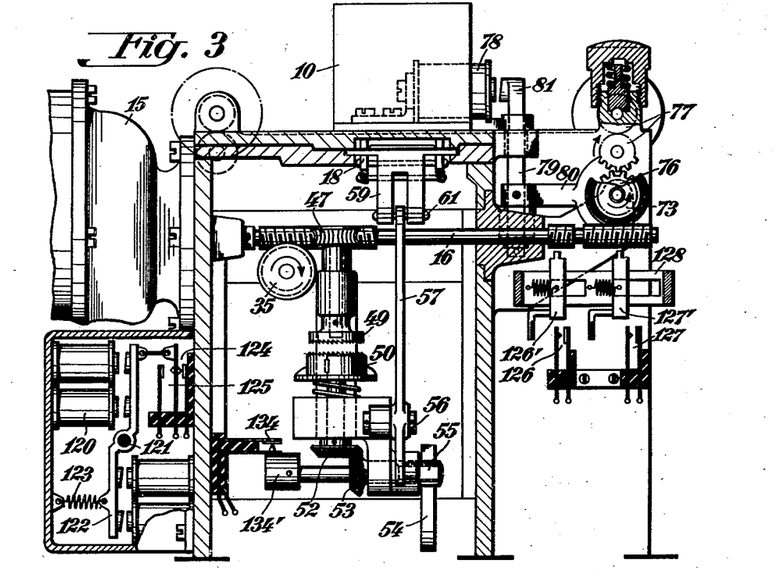
Fig. 3 is a section on line 3—3 of Fig. 1b and shows the driving mechanism of the machine.

The arrangement of the comparing magnets 120 is shown in Fig. 3 which shows four magnets provided for one decimal denomination. For four decimal denominations, of course, four of such sets of magnets are arranged adjacent each other. The comparing magnets 120 control an armature plate 122 pivotally mounted at 121, and normally held by a spring 123 in the position shown in Fig. 3 in which the plate 120 keeps the contact 124 closed. If now in one or a plurality of magnets the windings of the same are not compensated upon energization of the identification perforations but are energized by one of their windings, the armature plate 122 will be attracted by said magnets and will be rocked about the pivot 121 in counterclockwise direction so that the contact 124 will open and contact 125 will be closed. As will still be explained in connection with the circuit diagram, the contacts 124 and 125 control the release of the clutch magnet for the printing mechanism or for the plate feeding mechanism.

*Various contact mechanisms*

As may be seen from Fig. 3 the machine frame carries two contacts 126 and 127 being under the control of slides 126' and 127' respectively which are slidably mounted upon a frame 128. The slides 126' and 127' may be brought with their upper fingers in engagement with the grooves of the worm 16 if the frame 128 being pivotally mounted at 129 (see Fig. 1b) is rocked by the magnet 130. If the slides 126' and 127' are brought in engagement with the grooves of the continuously rotating worm 16 they will be moved against the action of their co-ordinated springs to the right so that the contacts 126 and 127 will close. Provision is made in such a way that at first the contact 126 and after a few further rotations of the worm 16 the contact 127 will be closed. Since the slides 126' and 127' are then in engagement with a dead thread of the groove, the contacts will then remain closed as long as the frame 128 holds the slides 126', 127' in engagement with the worm by the energized magnet 130. If the magnet 130 is deenergized the frame will be drawn downwardly under the influence of a spring not shown and will be drawn into the position illustrated in Fig. 3 so that the slides 126' and 127' may be immediately restored under the influence of their springs to home position and the contacts 126 and 127 are permitted to open.

Figure 6:
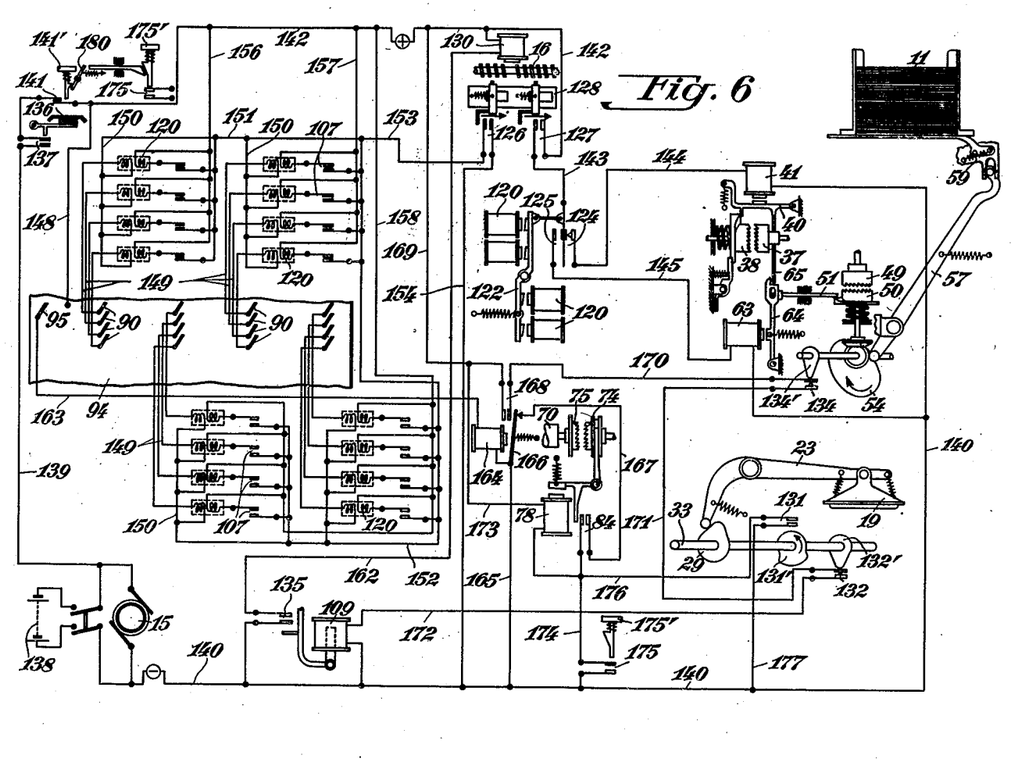
Fig. 6 shows the diagram of the machine.

For the control of the operations of the machine there are also provided two contacts 131 and 132 (Fig. 2a and Fig. 6) the first one being controlled by a cam 131' and the latter one being under the control of a cam 132'; the shape of said cams may be seen from Fig. 6. The cams 131' and 132' are fast upon the shaft 33 (Fig. 2a); if the printing mechanism is in home position as shown in Fig. 2a, the contact 132 is closed. If the shaft rotates for one revolution, after the first quarter of said revolution in which in the above described way the printing operation has been effected the contact 131 will be closed by the cam 131' and will remain closed long enough so that the clutch for the record sheet feed may be engaged and the hole 14 (Fig. 7) may be drawn away under brush 95 (Fig. 1); in the manner still to be described the record sheet feed is then automatically maintained even if the contact 131 has opened again.

A contact 134 being bent at right angles (Figs. 3 and 6) and being closed in home position of the plate feed mechanism, is controlled by the cam 134' the latter being fast upon the shaft of the cam disk 54. Consequently, said contact 134 is only closed if the printing mechanism is in home position while it is always open during the operating cycle. The solenoid 109 (Fig. 4) controls a contact 135 which is closed after the solenoid has entirely attracted its armature, i. e. if the analysis of the perforations of the address plate by means of pins 101 is already taking place. The contact 135 will, of course, also open again simultaneously with the deenergization of the solenoid 109.

In the table 190 of the addressing machine is a so called contact lever 136 (Figs. 1b and 6) pivotally mounted which is normally slightly resiliently held beyond the level of the table of the machine. The lever has coordinated thereto a normally open contact 137; if the record sheet is tensioned between the rollers 70 and 71, the lever 136 will be pressed slightly downwardly thereby closing the contact 137 which connects the electrical devices of the machine with the current source. Accordingly the machine may only be operated if there is a record sheet in the machine.

*Circuit diagram*

The current source 138 may be connected by the main switch to the main lines 139 and 140 of the machine to which lines the motor 15 is directly connected. From the contact 137 leads over stop contact 141 a line 142 terminating in contact 127 which on its part is connected by line 143 with the middle plate spring of the shiftable contact 124, 125. From the right side of the contact 124 leads a line 144 to the clutch magnet for the printing mechanism which is connected to the main line 140. The left side of the normally open contact 125 is connected by a line 145 with the clutch magnet 63 (for plate feeding) which in turn is also connected to the line 140.

The analyzing and comparing mechanism is inserted into the current circuit as will now be described: As will be seen from the circuit diagram, each magnet 120 comprises two windings. In the circuit of the one winding of each magnet lies the contact of the coordinated brush 90 with the contact plate 94 while the circuit of the other winding is controlled by the contact 107 (see also Fig. 4). The plate 94 is connected by a line 148 with line 142 and the brushes 90 are connected by lines 149 with their coordinated windings. The terminals of said windings are connected by common lines 150, both upper lines 150 leading to a common line 151 and both lower lines 150 leading to a common line 152. The lines 151 and 152 are connected to a common line 153 leading to the contact 126 which in turn is connected over line 154 with the lower main line 140. The address plate controlled magnet windings of both upper sets of magnets are connected by lines 156 and 157 directly to the upper line 142 while the corresponding lower sets are over line 158 in connection with line 142. The terminals of said windings in which the contacts 107 are arranged are connected as shown in Fig. 6 by common lines to the lines 151 and 152 connected to the line 153. It will be seen that from the positive pole (line 142), over line 148, contact plate 94 and brushes 90 the list perforation controlled magnet windings are connected over line 153, contact 126 and line 154 with the negative pole (line 140) of the current source; on the other hand, the address plate perforation controlled windings of the magnets 120 are connected with the one end by lines 156, 157 and 158 to the positive pole (142) while their terminal lines in which the contacts 107 are arranged are connected with line 153 leading in the above described way to the negative side (140) of the current source. Consequently, the comparing magnets 120 are controlled by the sheet perforations as well as by the perforations of the address plate in such a way that these perforations control closure of the contacts 90, 94 and 107 respectively; if these contacts are closed, no current circuit is yet established since the completion of the current circuit is controlled by contact 126 arranged in the common back line of all magnets; it is only if the circuits of the magnets have been prepared by the perforations of the list as well as by the perforations of the address plate that by closure of contact 126 the verification circuit may be finally completed so that the windings of the magnets 120 may be energized.

To the line 142 the magnet 130 is connected which in turn is connected by a line 162 over contact 135 with the line 140 so that the magnet 130 will be energized if due to the energization of the solenoid 109 the contact 135 is closed.

For controlling the paper feed, the brush 95 cooperating with the contact plate 94 is connected by line 163 with the relay 164 which in turn is connected over line 165 to line 140. The armature 166 of relay 164 establishes in the deenergized state of the relay a connection between the line 165 and the line 167 leading to the contact 84; however, if the relay 164 is energized its armature closes the contact 168 thereby connecting the line 169 with the line 170 leading to the contact 134. From the contact 134 leads a line 171 to the contact 132 and from said contact leads a line 172 to the solenoid 109 which is connected to the negative side 140 of the current source. From the line 169 branches a line 173 to the clutch magnet 78 for the record sheet feed, said magnet being connected to a line 174 leading over the start key controlled contact 175 to the negative line 140. To the line 174 is connected on the one hand the contact 84 and on the other hand over a line 176 the contact 131, the other side of said contact being over a line 177 in connection with line 140.

*Operation of the machine*

If the machine is in rest position all parts are in the position shown in the drawings and the electrical connections as shown in the circuit diagram are established. The address plates are inserted in the magazine 10 (Fig. 1b) with their relief side upwardly directed, the plate with the lowest account number lying lowermost while the plates with numbers increasing in current numerical order are following. The operator feeds the unprinted leading end of the continuous record sheet between the rollers 70 and 71 by means of the previously described handwheels in such a way that the sheet lies with its printed side upon the table of the machine. The record sheet is inserted with the end having the lowest account number so that the lists with raising account numbers will follow. If addressing is to be effected in the reverse order, of course, also all address plates must be inserted in the machine in reverse order. If the record sheet is tightly tensioned upon the table 190 of the addressing machine, the contact 137 is closed by contact lever 136 (see Fig. 6) thereby connecting the electrical mechanisms of the machine with the current source. It must still be mentioned that in this initial position of the record sheet all brushes 90 and also the brush 95 are insulated from the contact plate 94 since the leading end of the record sheet shall not be punched so that in the start position of the sheet there are no holes under the brushes.

In order to start the machine for operation, the operator depresses the start key 175' (Fig. 6) thereby closing the contact 175. Consequently, the clutch magnet 78 for the sheet feed receives current from the lines 169, 173, flowing then over line 174 and contact 175 to the negative line 140. The magnet 178 will therefore be energized and will engage in the previously described manner the clutches 74, 75, thereby operating the feed rollers 70 to feed the record sheet upwardly (Figs. 1a, 1b). Due to the energization of magnet 78 the contact 84 will be closed, said magnet establishing thereby its own stick circuit over the contact 84, line 167, armature 166 of relay 164 and line 165 so that after instantaneous actuation the start key 175' may again be released and the contact 175 may open again. The record sheet feed will now be maintained in operation and the sheet will be advanced by the feed rollers 70 until a standard point hole 14 (Fig. 7) comes under the brush 95 (Figs. 1a, 2a). In this moment a current impulse will be released from line 142 (Fig. 6) over line 148, contact plate 94, brush 95, line 163, relay 164 and line 165 to the negative line 140, and said impulse will energize relay 164. Consequently the armature 166 will be drawn to the left so that the stick circuit of clutch magnet 78 leading over line 167 and armature 166 will be immediately interrupted, thereby disengaging the clutches 74 and 75, and interrupting the record sheet feed operation. The continuous record sheet will therefore be stopped so that the standard point hole 14 will be arrested under the brush 95 and all predetermined hole positions of the list now being in printing position will be under the analyzing brushes 90 for the list perforations. Due to the energization of relay 164 the contact 168 has been closed and since also the contacts 134 and 132 of the coordinated mechanisms (now being in home position) are closed, a current will flow over line 169, contact 168, line 170, contact 134, line 171, contact 132, line 172 through the solenoid 109 to the line 140. The solenoid 109 will be energized and will lift its armature so that in the previously described manner analysis of the address plate feeding channel will be effected by means of pins 101 (Figs. 2a and 4). Due to the energization of the solenoid 109 the contact 135 will be closed after the address plate feeding channel has already been analyzed so that the magnet 130 will be energized over line 162. Consequently the frame 128 will be drawn upwardly and the previously described fingers will engage the worm 16 and will be moved to the right. Soon afterwards the contact 126 will be closed and a little later also contact 127. As has been mentioned above, the current circuit of the comparing magnets will be completed through contact 126. Since now, at the beginning of the addressing work, no address plate is in printing position, there will be no agreement with the perforations of the list being in printing position, and consequently thereof one or a plurality of the magnets 120 will become effective in the moment in which the contact 126 closes. The armature plate 122 will be rocked by said magnets 120 in counterclockwise direction so that the contact 124 opens and the contact 125 will be closed. Timing is provided in such a way that shifting of the contacts 124 and 125 is already completed if the contact 127 is closed by its coordinated slide. In the above assumed case, i. e. if no address plate is yet in printing position, upon closure of contact 127, a current will be sent over line 142, contact 127, line 143, contact 125, line 145 and clutch magnet 63 to the negative line 140 so that by the energization of clutch magnet 63 the one-revolution clutch 49, 50 will be engaged and a plate feeding cycle will be initiated. In the moment in which the one-revolution clutch 49, 50 is engaged, the contact 134 will open due to the cam 134' now moving from its home position so that the current circuit of the analyzing magnet 109 will open which in turn causes opening of contact 135. Consequently thereof, also magnet 130 will become deenergized and the frame 128 will return to its home position thereby also opening immediately the contacts 126 and 127. The magnets 120 will become deenergized and instead of contact 125 the contact 124 will again be closed. It will, however, be noticed that in the current source of the solenoid 109 no contact is open besides the contact 134. The contact 168 is still held closed by the relay 164 since the standard point hole 14 (Fig. 7) is still under the brush 95. On the other hand, also the contact 132 is still closed since the one-revolution clutch 37, 38 for the printing mechanism is not yet engaged. If now a plate has been advanced after one revolution of the cam disk 54, the contact 134 will again be closed by the cam 134' and thereupon the solenoid 109 will again be energized. This causes in the above described way closure of the current circuit of magnet 130 and consequently thereof closure of the contact 126 for actuation of the electric comparing mechanism. If then there is still no printing plate in printing position, magnet 63 will again be energized, a new plate feeding cycle will be initiated and the solenoid 109 will be deenergized by closure of contact 134. These operations will continue until the first printing plate reaches the printing position; it will be clearly seen that even if said printing plate is not provided with perforations corresponding to those of the list still being in printing position, the next plate will be advanced. If it is now assumed that for instance after a number of plate feeding cycles a plate comes into printing position the identification perforation of which agrees with the identification perforation of the list still being in printing position, the following operations will take place:

At the end of the preceding plate feeding cycle the contact 134 has been closed thereby deenergizing the solenoid 109. Consequently thereof, the contact 135 will have been closed and the magnet 130 will have been energized which in turn causes closure of contacts 126 and 127 in time sequence. If now the perforations of the list and of the address plate being in printing position are in agreement, both windings of the magnets coordinated to the perforated positions will be compensated while on all imperforate positions no energization of magnets will be effected at all; accordingly the armature plate 122 will remain in the position shown in Figs. 3 and 6 and the contact 134 will also remain closed. If then contact 127 is closed a current will flow from line 142 over contact 127, contact 124, line 144 and clutch magnet 41 to the negative line 140; due to the energization of magnet 41 the one-revolution clutch 37, 38 of the printing mechanism will be engaged. In the previously described mechanical way, however, simultaneously therewith also the one-revolution clutch 49, 50 for the plate feed mechanism will be engaged. During the first quarter of the operating cycle printing of the address plate being in printing position will be effected upon the list being in printing position, and during the second and third quarter of the operating cycle the next plate will be advanced into printing position. Since upon release of both one-revolution clutches the contacts 134 and 132 will open, of course, also the magnets 109 and 130 will immediately be deenergized. After printing has been effected by the printing cam 29, the cam 131' will encounter the contact 131 thereby establishing a shunt circuit to the start contact 175 and deenergizing immediately (still during the same operating cycle) the clutch magnet 78 for the sheet feeding mechanism. This magnet establishes then (if contact 131 opens again after having been left by the cam 131') over contact 84, line 167, relay armature 166 and line 165 its own stick circuit; it must be mentioned in this connection that the contact 131 remains closed until the record sheet feeding mechanism having been engaged in the meantime has already moved the standard point hole 14 away from the brush 95 and that due to relay 164 which has been deenergized thereby, a connection will again be established by armature 166 between line 167 and line 165 before contact 131 opens. It will be clearly seen that immediately after the first quarter of the machine cycle after printing has been effected the sheet feeding operation is initiated, while the plate feeding mechanism is still in rest position. By the feeding mechanism the next list will now be advanced and as soon as the standard point hole 14 of the next list comes under the brush 95, the relay 164 will again be energized so that the stick circuit of the clutch magnet 78 for the record sheet feed is interrupted and the list will again be stopped in printing position. However, simultaneously therewith also the contact 168 will be closed; independently thereof whether the operating cycle of the printing and plate feeding mechanism or the operation of the paper feeding mechanism is completed first, it is only if both operations are actually completed and if all parts are again in home and rest position that the solenoid 109 will again be energized since its circuit includes as well the contact 168 as the contacts 134 and 132. Due to the energization of the solenoid 109 another comparing cycle will be initiated and depending upon the result of said comparison either the contact 124 remains closed or the contact 125 will be closed. If the contact 124 remains closed, upon closure of contact 127 only the plate feeding mechanism will be released electromagnetically and the next address plate will be advanced into printing position while the list will stay in its position since the shaft 33 of the printing mechanism is not rotating and consequently thereof also contact 131 will not be closed. However, if the identification perforations are in agreement, the line 143 will be shifted to the contact 125 and clutch magnet 41 will be energized which releases the plate feeding mechanism as well as the printing mechanism; depending upon the latter the paper feed mechanism will then again be automatically engaged after completion of the printing operation, and a new list will be fed into printing position. It will be clearly seen that all these operations will be repeated in automatic and uninterrupted sequence so that the proper addresses will be printed upon the lists which are fed through the machine one by one.

If it is desirable to stop the machine during the operation, the stop key 141' (Fig. 6) may be actuated thereby opening the contact 141 and disconnecting all electrical connections from the current source so that the machine is stopped with the exception of the motor. The stop key 141' is then locked in its lower position by the pivotally mounted plate 180 so that the machine is not permitted to automatically restart. It is only upon actuation of the start key 175' that the slide controlled by said key rocks the plate 180 slightly in counterclockwise direction so that the stop key 141' is again released and the stop contact 141 will close so that all parts are again in their normal position and the machine will resume its operation after actuation of the start key 175'.

While there have been shown and described and pointed out the fundamental novel feature of the invention it will be understood that various omissions and substitutions and changes in the form and details of the devices illustrated and in its operation may be made by those skilled in the art without departing from the spirit of the invention. It is the intention therefore to read the following claims in the light of this understanding.

What I claim is:

1. In an automatic printing machine being under the joint control of perforated records and of index marks associated to address plates, a printing mechanism for taking impressions from said address plates, means for comparing said record perforations with said index marks, and means for feeding said perforated records past said comparing means, said feeding means being under the control of said comparing means.

2. In an automatic printing machine being under the joint control of perforated records and of index marks associated to address plates, a printing mechanism for printing said address plates upon the perforated records themselves bearing said perforations, means for comparing said record perforations with said index marks, and means for feeding said perforated records past said comparing means, said feeding means being under the control of said comparing means.

3. In a perforated record controlled machine, a printing mechanism for address plates having a printing mechanism for address plates having indexes associated thereto, means for feeding said records and said address plates, means for comparing said perforated records with said address plate indexes and means under the control of said comparing means for governing said printing mechanism and the feeding means for said records and said address plates.

4. In a cyclically operable automatic printing machine being under the joint control of perforated records and of index marks associated to address plates, means for feeding said perforated records and means for feeding said address plates one by one through the machine, means for comparing in each operating cycle index marks associated to an address plate with perforations on a record, printing means under the control of said comparing means for taking an impression from said index plates in each operating cycle in which said index marks agree with said perforations and means for controlling in each operating cycle the address plate feeding means and the record feeding means differentially depending upon the result of said comparison.

5. In an automatic printing machine being under the joint control of perforated records and of index marks associated to address plates, means for feeding said perforated records and means for feeding said address plates one by one through the machine, means for comparing the index marks associated to the address plates with the perforations on said records, printing means under the control of said comparing means for taking an impression from said address plates upon agreement of said index marks with said perforations and for actuating both the address plate feeding means and the record feeding means while upon disagreement the printing mechanism and record feeding means remain inactive whereas the address plate feeding means are actuated.

6. In an automatic printing machine being under the joint control of perforated records and of index marks associated to address plates, a printing mechanism for printing the address plates upon the records themselves bearing the perforations, means for comparing the index marks associated to the address plates with the perforations on said records and means under the control of said comparing means for automatically printing upon agreement of said index marks with said perforations the address plates upon the corresponding perforated records.

7. In an automatic printing machine being under the joint control of perforated records and of index marks associated to address plates printing means for printing said address plates upon said records themselves, means for feeding said perforated records and means for feeding said address plates through the machine, means for comparing the index marks associated to the address plate with the perforations on said records, and means under the control of said comparing means for causing said printing means to print upon agreement of said index marks with said perforations the address plates upon the corresponding perforated records, and means also under the control of said comparing means for governing said feeding means.

8. In an automatic printing machine being under the joint control of perforated records and of index marks associated to address plates, a printing mechanism for printing the address plates upon the records themselves bearing the perforations, means for feeding the perforated records through the machine and means for feeding said address plates through the machine, means for comparing the index marks associated to the address plates with the perforations on said records and means under the control of said comparing means for printing upon agreement of comparing means for printing upon agreement of said index marks with said perforations the address plate upon the corresponding perforated record and means for controlling the address plate feeding means and the record feeding means differentially depending upon the result of said comparison.

9. In an automatic printing machine being under the joint control of perforated records and of index marks associated to address plates, a printing mechanism for printing the address plates upon the records themselves bearing the perforations, means for feeding the perforated records one by one through the machine and means for feeding said address plates one by one through the machine, means for comparing the index marks associated to the address plate with the perforations on said records, and means under the control of said comparing means for printing upon agreement of said index marks with said perforations the address plate through said printing mechanism upon the corresponding perforated record and for actuating both the address plate feeding means and record feeding means while upon disagreement the printing mechanism and record feeding means remain inactive whereas the address plate feeding means are actuated.

10. In an automatic printing machine being under the joint control of perforated records and of index marks associated to address plates, a printing mechanism for taking an impression from said address plates, means for comparing said perforated records with the index marks associated to the address plates, means for feeding said records one by one past said comparing means and means for feeding said address plates one by one past said comparing means, means under the control of said comparing means for causing upon agreement of said index marks with said perforations said printing mechanism to take an impression from said address plate while upon disagreement the printing mechanism remains inactive, and means for controlling the address plate feeding means and the record feeding means differentially depending upon the result of said comparison.

11. In an automatic addressing machine being under the joint control of perforated records and of index marks associated to address plates, a printing mechanism for taking an impression from said address plates, means for comparing said perforated records with the index marks associated to the address plates, means for feeding said records one by one past said comparing means and means for feeding said address plates one by one past said comparing means, means under the control of said comparing means for causing upon agreement of said index marks with said perforations said printing mechanism to take an impression from said address plate and for actuating both the address plate feeding means and record feeding means to feed the subsequent address plate and subsequent record to said comparing means while upon disagreement of said index marks with said perforations the printing mechanism and record feeding means remain inactive whereas the address plate feeding means are actuated to feed the subsequent address plate to said comparing means.

12. In an automatic addressing machine being under the joint control of perforated records and of index marks associated to address plates, a printing mechanism for taking an impression from said address plates, means for comparing said perforated records with the index marks associated to the address plates, while the latter are in printing position, means for feeding said records one by one past said comparing means and means for feeding said address plates one by one in printing position past said comparing means, means under the control of said comparing means for causing upon agreement of said index marks with said perforations actuation of the printing mechanism to take an impression from the address plate being in comparing position and for actuating both the address plate feeding means and record feeding means to feed the subsequent address plate to printing position and the subsequent record to said comparing means while upon disagreement of said index marks with said perforations the printing mechanism and record feeding means remain inactive whereas the address plate feeding means are actuated to feed the subsequent address plate to printing position.

13. In an automatic addressing machine being under the joint control of perforated records and of index marks associated to address plates, a printing mechanism for printing the address plates upon the records themselves bearing the perforations, feeding means for feeding said perforated records one by one past said printing mechanism and feeding means for feeding said address plates one by one past said printing mechanism means for comparing the index marks associated to the address plate being in printing position with the perforations on the record being in printing position, and means under the control of said comparing means for actuating upon agreement of said index marks with said perforations the printing mechanism to print the address plate upon the corresponding perforated record while upon disagreement said printing mechanism remains inactive, and means for controlling the address plate feeding means and the record feeding means differentially depending upon the result of said comparison.

14. A machine as specified in claim 13 wherein the comparing means are provided for simultaneous comparison of a perforated record and an address plate while both are in printing position.

15. A machine as specified in claim 13 wherein the comparing means include electrical analyzer means for the perforated records and mechanical analyzer means for the address plates.

16. A machine as specified in claim 13 wherein the comparing means include electrical analyzers for the perforated records, mechanical analyzers for the address plates, and a set of electromagnets being under the joint control of said electrical analyzers and of said mechanical analyzers, the circuits of said electromagnets including two sets of controlling contacts, the one set of said contacts being represented by said electrical analyzers while the second set comprises separate contacts controlled by said mechanical analyzers.

17. A machine as specified in claim 13 wherein comparing means are provided adapted to respond to perforations in said records arranged according to the hole combinational system and adapted to respond to indexes on said address plates provided in combinational arrangement, the perforations and the indexes being provided according to the same combinational key.

18. In an automatic addressing machine being under the joint control of perforated records and of index marks associated to address plates, a printing mechanism for printing the address plates upon the records themselves bearing the perforations, means for comparing said perforated records with the index marks associated to the address plates, means for feeding said records one by one past said comparing means and means for feeding said address plates one by one past said comparing means, means under the control of said comparing means for causing upon agreement of said index marks with said perforations the printing mechanism to print the address plate upon the corresponding perforated record while upon disagreement the printing mechanism remains inactive, and means for controlling the address plate feeding means and the record feeding means differentially depending upon the result of said comparison.

19. In an automatic addressing machine being under the joint control of perforated records and of index marks associated to address plates, a printing mechanism for printing the address plates upon the records themselves bearing the perforations, feeding means for feeding said perforated records one by one past said printing mechanism and feeding means for feeding said address plates one by one past said printing mechanism, means for comparing the index marks associated to the address plate being in printing position with the perforations on the record being in printing position, and means under the control of said comparing means for actuating upon agreement of said index marks with said perforations the printing mechanism to print the address plate upon the corresponding perforated record and for actuating both the address plate feeding means and record feeding means to feed the subsequent address plate and the subsequent record to printing position while upon disagreement of said index marks with said perforations said printing mechanism and record feeding means remain inactive whereas the address plate feeding means are actuated to feed the subsequent address plate to printing position.

20. In an automatic addressing machine being under the joint control of perforated records and of index marks associated to address plates, a printing mechanism for printing the address plates upon the records themselves bearing the perforations, means for comparing said perforated records with the index marks associated to the address plates, means for feeding said records one by one past said comparing means and means for feeding said address plates one by one past said comparing means, means under the control of said comparing means for causing upon agreement of said index marks with said perforations the printing mechanism to print the address plate upon the corresponding perforated record and for actuating both the address plate feeding means and record feeding means to feed the subsequent address plate and subsequent record to said comparing means while upon disagreement of said index marks with said perforations the printing mechanism and record feeding means remain inactive whereas the address plate feeding means are actuated to feed the subsequent address plate to said comparing means.

21. In an automatic addressing machine being under the joint control of designation perforations spaced apart along a continuous record sheet and of index marks associated to address plates, a printing mechanism for printing the address plates upon the record sheet sections bearing the designation perforations, means for feeding said perforated record sheet sections one by one past said printing mechanism, and means for feeding said address plates one by one past said printing mechanism, means for comparing the index marks associated to the address plate being in printing position with the designation perforations of the record sheet section being in printing position, and means under the control of said comparing means for actuating upon agreement of said index marks with said designation perforation the printing mechanism to print the address plate upon the corresponding perforated record sheet section while upon disagreement said printing mechanism remains inactive, and means for controlling the address plate feeding means and the record sheet feeding means differentially depending upon the result of said comparison.

22. A machine as specified in claim 21 wherein the printing mechanism includes a printing platen movable towards a table supporting the address plates, wherein the record sheet feeding means include feeding rollers arranged opposite said printing platen and wherein the comparing means include analyzers for the designation perforations arranged adjacent the printing platen between said feeding rollers and wherein address plate analyzers are arranged on the lower side of said table.

23. In an automatic addressing machine being under the joint control of designation perforations spaced apart along a continuous record sheet and of index marks associated to address plates, a printing mechanism for printing the address plates upon the record sheet sections bearing the designation perforations, means for feeding said perforated record sheet sections one by one past said printing mechanism, and means for feeding said address plates one by one past said printing mechanism, means for comparing the index marks associated to the address plate being in printing position with the designation perforations of the record sheet section being in printing position, and means under the control of said comparing means for actuating upon agreement of said index marks with said designation perforation the printing mechanism to print the address plate upon the corresponding perforated record sheet section and for actuating thereafter both the address plate feeding means and record sheet feeding means to feed the subsequent address plate and the subsequent record sheet section to printing position while upon disagreement of said index marks with said designation perforations the printing mechanism and record sheet feeding means remain inactive whereas the address plate feeding means are actuated to feed the subsequent address plate to printing position.

24. A machine as specified in claim 23 having driving means, a clutch between the address plate feeding means and said driving means and another clutch between the printing mechanism and said driving means, each clutch being controllable by the comparing means, the clutch for the printing mechanism being in operative engagement with the clutch for the plate feeding means to actuate the latter clutch each time the first mentioned clutch is actuated while the clutch for the plate feeding means is also controllable by the comparing means independently from the clutch for the printing mechanism.

25. In an automatic addressing machine being under the joint control of designation perforations spaced apart along a continuous record sheet and of index marks associated to address plates, a printing mechanism for printing the address plates upon the record sheet sections bearing the designation perforations, means for feeding said perforated record sheet sections one by one past said printing mechanism, said feeding means being under the control of guide holes in the record sheet, one hole being coordinated to each designation perforation and means for feeding said address plates one by one past said printing mechanism, means for comparing the index marks associated to the address plate being in printing position with the designation perforation of the record sheet section being in printing position, said feeding means being stopped under the control of a guide hole in the record sheet and said comparing means becoming thereafter automatically active and means under the control of said comparing means for actuating upon agreement of said index marks with said perforations the printing mechanism to print the address plate upon the corresponding perforated record sheet section while upon disagreement said printing mechanism remains inactive and means for controlling the address plate feeding means and the record sheet feeding means differentially depending upon the result of said comparison.

26. A machine as specified in claim 25 wherein the comparing means include a plurality of analyzer feelers provided on a carrier adjustable relatively to printing position and bearing also a single analyzer feeler for the guide hole coordinated to each designation perforation.

27. In an automatic addressing machine being under the joint control of designation perforations spaced apart along a continuous record sheet and of index marks associated to address plates, a printing mechanism for printing the address plates upon the record sheet sections bearing the designation perforations, means for feeding said perforated record sheet sections one by one past said printing mechanism, said feeding means being under the control of guide holes in the record sheet, one hole being coordinated to each designation perforation and means for feeding said address plates one by one past said printing mechanism, means for comparing the index marks associated to the address plate being in printing position with the designation perforation of the record sheet section being in printing position, said feeding means being stopped under the control of a guide hole in the record sheet and said comparing means becoming thereafter automatically active and means under the control of said comparing means for actuating upon agreement of said index marks with said perforations the printing mechanism to print the address plate upon the corresponding perforated record sheet section and for actuating thereafter both the address plate feeding means and record sheet feeding means to feed the subsequent address plate and the subsequent record sheet section to printing position while upon disagreement of said index marks with said designation perforation the printing mechanism and record sheet feeding means remain inactive whereas the address plate feeding means are actuated to feed the subsequent address plate to printing position.

28. In an automatic addressing machine being under the joint control of designation perforations spaced apart along a continuous record sheet and of index marks associated to address plates, a printing mechanism for printing the address plates upon the record sheet sections bearing the designation perforations, means for comparing the index marks associated to the address plate being in comparing position with the designation perforations of the record sheet section being in comparing position, means for feeding said perforated record sheet sections one by one past said comparing means and means for feeding said address plates one by one past said comparing means, means under the control of said comparing means for causing upon agreement of said index marks with said designation perforation the printing mechanism to print the address plate upon the corresponding perforated record sheet section while upon disagreement said printing mechanism remains inactive, and means for controlling the address plate feeding means and the record sheet feeding means differentially depending upon the result of said comparison.

29. In an automatic addressing machine being under the joint control of designation perforations spaced apart along a continuous record sheet and of index marks associated to address plates, a printing mechanism for printing the address plates upon the record sheet sections bearing the designation perforations, means for comparing the index marks associated to the address plate being in comparing position with the designation perforations of the record sheet section being in comparing position, means for feeding said perforated record sheet sections one by one past said comparing means and means for feeding said address plates one by one past said comparing means, means under the control of said comparing means for causing upon agreement of said index marks with said designation perforation the printing mechanism to print the address plate upon the corresponding perforated record sheet section and for actuating both the address plate feeding means and record sheet feeding means to feed the subsequent address plate and the subsequent record sheet section to said comparing means while upon disagreement of said index marks with said designation perforations the printing mechanism and record sheet feeding means remain inactive whereas the address plate feeding means are actuated to feed the subsequent address plate to said comparing means.

30. In an automatic addressing machine being under the joint control of designation perforations spaced apart along a continuous record sheet and of index marks associated to address plates, a printing mechanism for printing the address plates upon the record sheet sections bearing the designation perforations, means for comparing the index marks associated to the address plate being in comparing position with the designation perforation of the record sheet section being in comparing position, means for feeding said perforated record sheet sections one by one past said comparing means, said feeding means being stopped under the control of guide holes in the record sheet, one hole being coordinated to each designation perforation, means for feeding said address plates one by one past said comparing means, said comparing means becoming automatically active upon stopping of said feeding means under the control of a guide hole, and means under the control of said comparing means for actuating upon agreement of said index marks with said perforations the printing mechanism to print the address plate upon the corresponding perforated record sheet section while upon disagreement the printing mechanism remains inactive and means for differentially controlling the address plate feeding means and the record sheet feeding means depending upon the result of said comparison.

31. In an automatic addressing machine being under the joint control of designation perforations spaced apart along a continuous record sheet and of index marks associated to address plates, a printing mechanism for printing the address plates upon the record sheet sections bearing the designation perforations, means for comparing the index marks associated to the address plate being in comparing position with the designation perforation of the record sheet section being in comparing position, means for feeding said perforated record sheet sections one by one past said comparing means, said feeding means being stopped under the control of guide holes in the record sheet, one hole being coordinated to each designation perforation, means for feeding said address plates one by one past said comparing means, said comparing means becoming automatically active upon stopping of said feeding means under the control of a guide hole, and means under the control of said comparing means for actuating upon agreement of said index marks with said perforations the printing mechanism to print the address plate upon the corresponding perforated record sheet section and for actuating both the address plate feeding means and record sheet feeding means to feed the subsequent address plate and the subsequent record sheet section to said comparing means while upon disagreement of said index marks with said designation perforations the printing mechanism and record sheet feeding means are held inactive whereas the address plate feeding means are actuated to feed the subsequent address plate to said comparing means.

32. In an automatic printing machine being under the joint control of perforated records and of index marks associated to address plates, a printing mechanism for printing said address plates upon the perforated records themselves bearing said perforations, means for comparing the index marks associated to the address plates with the perforations on said records, and means under the control of said comparing means for automatically printing upon agreement of said index marks with said perforations the address plates upon the corresponding perforated records, said comparing means being adjustable relatively to said printing mechanism.

MICHAEL MAUL.